(12) United States Patent
Van Gestel

(10) Patent No.: US 7,283,727 B1
(45) Date of Patent: Oct. 16, 2007

(54) METHOD OF AND DEVICE FOR RECORDING INFORMATION

(75) Inventor: Wilhelmus Jacobus Van Gestel, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1202 days.

(21) Appl. No.: 09/787,058

(22) PCT Filed: Jul. 12, 2000

(86) PCT No.: PCT/EP00/06625

§ 371 (c)(1),
(2), (4) Date: Mar. 13, 2001

(87) PCT Pub. No.: WO01/06512

PCT Pub. Date: Jan. 25, 2001

(30) Foreign Application Priority Data

Jul. 15, 1999 (EP) .................................. 99202322

(51) Int. Cl.
*H04N 5/91* (2006.01)

(52) U.S. Cl. ........................................ 386/95; 386/125

(58) Field of Classification Search .................. 386/46, 386/95, 105, 106, 112, 116; 369/47.14; 714/710
See application file for complete search history.

(56) References Cited

U.S. PATENT DOCUMENTS

| | | | | |
|---|---|---|---|---|
| 5,914,928 A | * | 6/1999 | Takahashi | ................ 369/47.14 |
| 6,282,365 B1 | * | 8/2001 | Gotoh et al. | .................. 386/95 |
| 6,367,038 B1 | * | 4/2002 | Ko | .............................. 714/710 |

FOREIGN PATENT DOCUMENTS

EP     0798716 A  * 10/1997

* cited by examiner

*Primary Examiner*—Huy Nguyen
(74) *Attorney, Agent, or Firm*—Michael E. Belk

(57) ABSTRACT

A method is described for writing real time video signals on an optical disc having a recording area which comprises an administrative area, a spare area, and a user area. Normal recording takes place in blocks in a first pre-reserved area of a free part of the user area. If during the recording process a defective block is encountered a replacement recording having the size of a plurality of blocks is made in a second pre-reserved area of the free part of the user area, after which normal recording continues in the first pre-reserved area.

20 Claims, 1 Drawing Sheet

METHOD OF AND DEVICE FOR RECORDING INFORMATION

Figure 1:
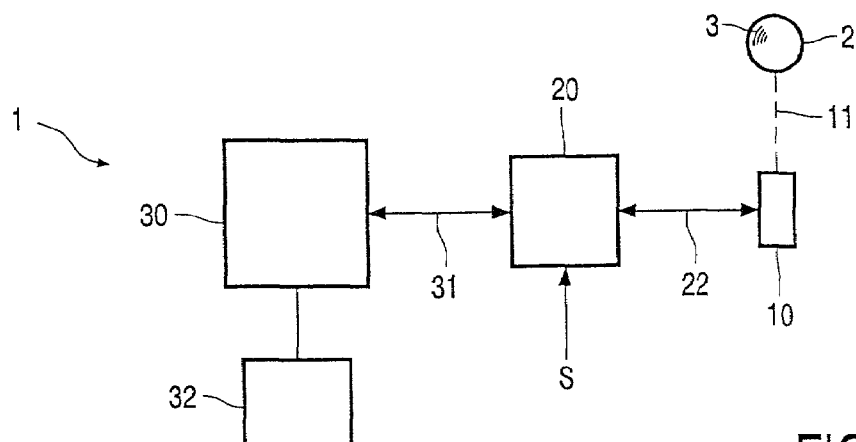

The present invention generally relates to the recording of information, particularly digital information, on a disc-shaped recording medium such as an optical disc or a magnetic disc, hereinafter also referred to as "recording disc". As is well-known, such a recording disc has a multitude of concentric substantially circular recording tracks. Such recording tracks may take the form of individual circular tracks or of one continuous spiral track. Each track is divided into logic blocks and each block has a data area for the recording of data. Furthermore, each block usually has an area reserved for the recording of a check number or "check sum".

In general, the amount of information to be recorded in a recording session is greater than one block. The information to be recorded, also referred as "file", is then divided into successive data packets having the size of one block, and the successive data packets of a file are recorded in different blocks of the disc. For a rapid data transfer it is then desirable that the successive data packets are recorded in successive blocks. The recording process can then proceed virtually continuously. Likewise, during the subsequent reading (playback) of the information recorded on the disc the read process can proceed continuously.

In practice, a disc may exhibit defective blocks, i.e. blocks where a faultless recording of information is no longer possible or where any resulting small write errors can no longer be corrected during reading. Such a block is then no longer suited for recording. It is customary to reserve a spare area on the recording disc, which area cannot be addressed by the user and is intended for replacement of any defective blocks. When during recording a defective block is found, recording is effected in a block of the spare recording area instead of in the defective block.

After recording of a data packet in a block of the spare recording area the recording of the following data packets is continued in a block following the defective block. Therefore, such a replacement requires two jumps of the recording head and likewise two jumps of the read head are required to read the information.

These jumps of the read or write head from the normal recording area to the spare recording area and back take comparatively much time and reduce the average transmission speed of the information. This is particularly undesirable in situations in which a very high transmission speed is required, as for example in a real time recording of audio and/or video signals.

For such uses it is proposed not to make the jumps to spare recording area and back for each individual damaged block but, when a defective block is found, to record a file portion comprising a plurality of blocks in the spare area. The jumps now do not occur directly after one another in time but the time between them is longer. The transmission speed averaged over a time interval which does not include both jumps is then higher. However, a consequence is then that the spare recording area is filled rapidly, a substantial number of the data packets recorded in the spare recording area then wrongfully occupying space in the spare recording area because the blocks corresponding to these data packets in the normal recording area are not defective. Thus, a reduction of the number of jumps is attended by a comparatively inefficient use of the spare recording area and the spare recording area is filled more rapidly; once the spare recording area is full the disc can no longer be used for further recording. Conversely, this means that the number of file portions for which a replacement recording is made in the spare area is comparatively small.

It is an object of the present invention to provide a solution for the aforementioned problems.

In accordance with an important aspect of the present invention the replacement recording is effected in a free recording area, i.e. a freely accessible addressable area which has not yet been used. This area is large enough to record file portions having a length of hundreds of blocks in succession. Prior to the recording the allocation manager reserves a certain portion of the free recording area as a replacement area. This reservation implies, on the one hand, that the allocation manager will not use the addresses in this reserved portion of the free recording area for recording. If during recording a defective block is found the write head jumps to a suitable address in the reserved replacement zone of the free recording area, for example the first free address in the replacement zone, and a replacement recording is made in said replacement zone. After recording of a file portion in this replacement zone the write head returns to the normal recording area.

Upon completion of the recording session the allocation manager is informed which addresses in the replacement zone have been used for replacement and which replacement addresses correspond to which original addresses. The allocation manager then knows which addresses of the free area are no longer free and which of the originally allocated addresses have not been used and are therefore, in fact, still free.

At option, this information may already be transferred to the allocation manager during the recording session, as a result of which, if this is necessary, the allocation manager can reserve additional space in the normally accessible space during the recording process, for example when a very large number of errors occurs.

Figure 2:
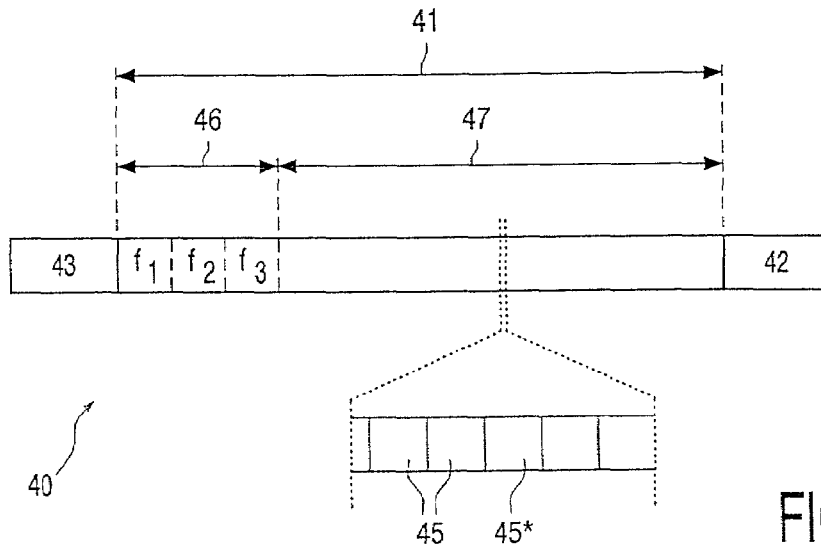
Figure 3:
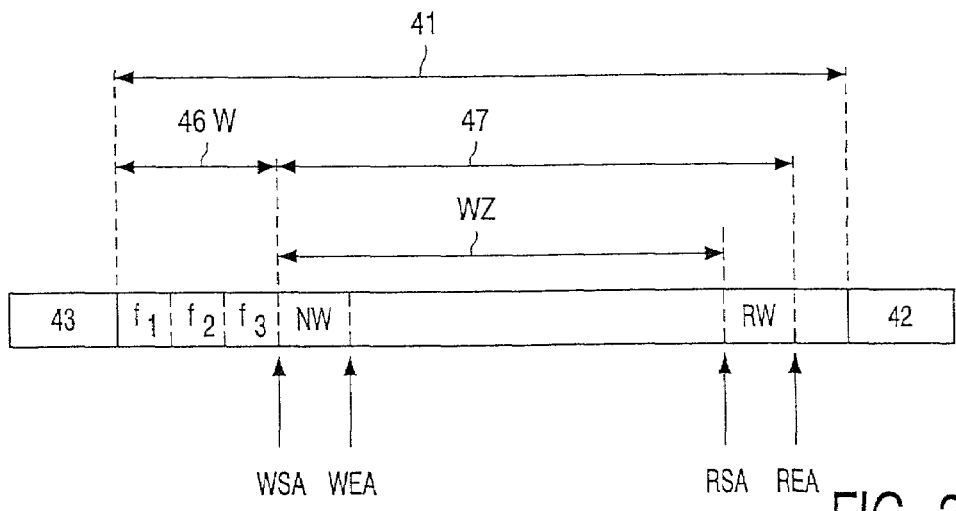

These and other aspects, features and advantages of the present invention will be elucidated further by means of the following description of a preferred embodiment of the invention with reference to the drawings, in which:

FIG. 1 is a block diagram which shows a part of a recording apparatus;

FIG. 2 diagrammatically shows the logic structure of a recording disc in order to illustrate a conventional recording method; and FIG. 3 diagrammatically shows the logic structure of a recording disc in order to illustrate a recording method in accordance with the present invention.

FIG. 1 shows a block diagram of a part of a recording apparatus 1 suitable for recording real-time video or audio signals S on a recording disc 2.

It will be evident to one skilled in the art that the scope of the present invention is not limited to the examples described hereinbefore but that that various changes and modifications thereto are possible without departing from the scope of the invention as defined in the appended Claims. For example, the present invention is already advantageous if only predetermined test tracks are examined in the test procedure, even if the test procedure is not based on the use of the tracking signal, although this is preferred. The disc 2 may be a magnetic disc but the present invention is intended particularly for optical recording. The disc 2 has a multitude of mutually concentric recording tracks 3, which are assumed to be individual circular tracks hereinafter but it is likewise possible that the tracks 3 represent one continuous spiral track. As is known per se, the apparatus 1 has an optical write/read head 10 and a turnable, which is not shown for the sake of simplicity and which faces the head 10, on which turntable the disc 2 can be positioned and by means of which the disc 2 can be given a rotational movement with respect to the head 10, thus enabling a track 3 to be scanned by the head 10. The recording apparatus 1 further includes means, which are known per se and which are not shown for the sake of simplicity, for moving the head 10 in a radial direction of the disc 2, thus enabling different tracks 3 of the disc 2 to be accessed by the head 10. As is well-known, information is written in the track 3 by means of a laser beam 11 from the head 10.

The write process is controlled by a functional unit 20, referred to hereinafter as the write control unit. Such a write control unit 20 is known per se and is therefore not described any further. It is to be noted merely that the write control unit 20 is adapted to control the positioning of the head 10 with respect to the disc 2 in such a manner that the write process takes place at a desired location on the disc 2 through control of said turntable for the disc 2 and said positioning means for the write head 10. Furthermore, the write control unit 20 control the intensity of the laser beam 11 in dependence on the input signal S to be recorded. This control function of the write control unit 20 is represented diagrammatically as the coupling 22 in FIG. 1.

The recording apparatus 1 further has a functional unit 30, hereinafter termed the allocation manager. Such an allocation manager 30 is know per se and is therefore not described any further. It is to be noted merely that the allocation manager 30 is adapted to determine on which part of the disc 2 a certain recording session or recording is to take place. When a user starts a recording the allocation manager 30 determines whether there is enough space for the recording on the relevant disc 2, and if this is the case, where this space is available. The allocation manager 30 informs the write control unit 20 of the starting location of this available space, which is represented diagrammatically as the signal coupling 31.

FIG. 2 diagrammatically represents the logic structure of the disc 2. The recording tracks 3 together define a recordable area 40 of the disc 2, which is shown as a continuous strip and which will also be referred to hereinafter as the recording area.

The recording area 40 of the disc 2 has been divided into logic blocks 45, which each have an individual predetermined address. The value of the relevant address of a block 45 has been recorded in a predetermined address field of the block 45. It is thus possible to record information directly at a given location which corresponds to a given address on the disc 2 and it is likewise possible to read the information directly from a given location which corresponds to a given address. The blocks 45 have a block size which needs not be equal for all the blocks. The amount of data that can be written in one block is termed a data packet.

The recording area 40 consists for a substantial part of a so-called addressable space 41, which can be accessed by a user in order to record information, in the present example digitized video signals. This addressable space 41 will therefore also be referred to hereinafter as the user area.

The recording area 40 of the disc 2 further includes a spare area 42, which is not addressable and which is used as a replacement area. The relative storage capacities of the user area 41 and the spare area 42 are not shown to scale in FIG. 2: in general, the size of the spare area 42 is only a few per cent of the size of the user area 41.

The disc 2 further has a predetermined area 43 which stores information relating to the contents of the disc. This information may relate to, for example, the number of files on the disc 2, the start addresses of the files, the lengths of the files, the names of the files etc. This area 43 will also be referred to hereinafter as the administrative area.

In FIG. 2 files bear the references f1, f2, f3 etc. In general, files occupy a plurality of blocks 45, so that a file comprises a plurality of data packets. The part of the user area 41 which has already been used for file storage will be referred to as occupied user area 46 or occupied space. The non-used part of the user area 41 is still free: this part will be referred to hereinafter as the free user area or free space 47. The blocks which are used by a file do not necessarily adjoin one another directly in the addressable area 41. The file may comprise a plurality of segments, which may each comprise a plurality of blocks, which segments may be scattered within the addressable area 41. The free space therefore consists of a plurality of segments with blocks that have not yet been used. These addresses are kept in the administrative space 43. For the sake of simplicity the files are represented as a single continuous area.

When the disc 2 is loaded into recording apparatus the allocation manager 30 instructs the write control unit 20, via the coupling 31, to read the administrative area 43 and to transfer the information thus read to the allocation manager 30 via the coupling 31. The allocation manager 30 stores the read information in an associated memory 32. The allocation manager 30 now knows which part of the user area 41 of the disc 2 is occupied by prior recordings of files f1, f2 etc. and is consequently occupied user area 46 or occupied space. As a consequence, the allocation manager 30 also knows which part of the user area 41 is still free and is consequently free user area or free space 47.

When the allocation manager 30 receives a new write command the allocation manager 30 checks in the associated memory 32 which part of the user area 41 is free space and sends a start address and an end address in this free space to the write control unit 20 via the communication line 31. The allocation manager 30 also stores this data in the memory 32 as an indication that the portion of the user area 41 defined by said start address and end address no longer belongs to the free user area 47 but to the occupied user area 46. The write control unit 20 controls the recording process for the incoming signal 8 to be recorded, which is effected in a customary manner, starting at said start address received from the allocation manager 30. When the recording process has been completed the write control unit 20 reports this to the allocation manager 30 via the communication line 31, after which the allocation manager 30 instructs the write control unit 20 to update the data in the administrative area 43 of the disc 2.

The user area 41 may contain defective blocks 45*. It is then possible that the presence of certain defective blocks 45* is not known in advance to the allocation manager 30, as a result of which, these defective blocks 45* are normally used for allocation. However, it is also possible that prior to recording the allocation manager 30 knows which blocks are unusable as a result of the presence of defects. In the conventional manner these blocks 45* are still used for allocation. The write control unit 20 is assumed to select an alternative location by itself. If during the write process the write head 10 then reaches a defective block 45*, the write control unit 20 should move the write head 10 to an alternative block and the data packet which should have been written in the relevant defective block 45* is recorded in said alternative block. After recording of the data packet in the alternative block the write control unit 20 directs the write head 10 back to the user area 41 in the conventional manner.

Such an alternative block is also termed a replacement block 45' and the recording of the data packet in a replacement block 45' is also referred to as a replacement recording.

Conventionally, an alternative block 45' is selected in the spare area 42.

Owing to the to and fro movement of the write head 10 much time is lost, as a result of which such a conventional write process is not very suitable for the processing of real time video signals. The present invention proposes to reduce the number of jump movements of write head 10 and to increase the time between successive jump movements in that, when the write head 10 reaches a defective block 45* and it is consequently necessary to jump to a replacement block 45', the replacement recording is effected not just for the single data packet to be written into the defective block but in that prior to jumping back also a large number of subsequent data packets are written into the replacement blocks 45*. The number of subsequent data packets thus written into the replacement blocks 45 can be 100 or more. As a matter of fact, errors often occur in clusters. By taking a larger number of data packets the number of jumps is reduced. Such a sequence of successive data packets written into replacement blocks 45' is also termed a file portion.

The predefined reserve area 42 is comparatively small. In particular, this spare area 42 has been designed for a capacity of approximately 3% of the overall disc capacity, thus providing an alternative write capability for all the defective blocks 45* if not more than 3% of the blocks are defective. In the conventional write process this is amply sufficient in practice because in that case only a single replacement block 45' in the spare area 42 is utilized for each defective block 45* in the user area 41. However, if the file portions having a size of 100 or more data packets are written in the spare area 42 at the same time, it is inevitable that also a large number of replacement blocks 45' of the spare area 42 are required as an alternative recording area for non-defective blocks 45 of the user area 41. This means that the spare area 42 is filled rapidly and may already be full even when the number of defective blocks 45* in the user area 41 is much smaller than 3%. When the spare area 42 is full the disc 2 can no longer be used for further recording.

The present invention also provides a solution for this problem.

For this purpose, in accordance with the present invention, the allocation manager 30 is adapted to reserve two different areas in the free user area for recording, a first area being reserved for normal recording and a second area being reserved for replacement recording. The allocation manager 30 informs the write control unit 20 about these areas. The write control unit 20 is adapted to perform a normal recording in the first area and, when defective blocks 45* are found, to perform a replacement recording for a file portion in the second area.

As illustrated in FIG. 3, the allocation manager 30 can, for this purpose, be adapted to specify a write start address WSA and a write end address WEA in the free user area 47, which addresses reserve an area NW for normal recording, and to specify also a replacement start address RSA and a replacement end address REA in the free user area 47, which addresses reserve an area RW for replacement recording. FIG. 3 shows that the area NW reserved for normal recording is situated at the beginning of the free user area 47 and the area RW reserved for replacement recording is situated at the end of the free user area 47. In reality, the free user area will comprise a plurality of non-adjoining areas scattered over the entire addressable space. Therefore, it is also possible that the area RW reserved for replacement recording adjoins the area NW reserved for normal recording.

The allocation manager 30 is adapted to communicate these addresses to the write control unit 20, which in its turn is adapted to ensure that the recording of the information stream in the area NW reserved for normal recording within the free user area 47 proceeds in the conventional manner. However, the write control unit 20 is adapted to ensure that, when a defective sector 45* is found, the write head 10 jumps to a location in the replacement zone RW within the free user are 47, to effect a replacement recording of a file portion at said location, and subsequently to cause the write head 10 to jump back to the area NW reserved for normal recording within the free user area 47. It will be evident that in this way replacement recording is effected without the drawbacks described hereinbefore. Thus, in particular, the spare area 42 is not utilized.

As is customary, the write control unit 20 reports to the allocation manager 30 when the recording process has finished, upon which the allocation manager 30 instructs the write control unit 20 to update the data in the administrative area 43 of the disc 2. The allocation manager 30 adds the addresses in the area RW reserved for replacement recording to said administrative data in the administrative area 43. The non-used addresses with the defects are left in the free user area. It is possible to add these addresses to the list of non-reliable addresses. During a subsequent recording the allocation manager 30 could then decide not to use these addresses for allocation. This precludes a loss of time during re-allocation.

Thus, the occupied space 46 of the user area 41 now comprises a part 46W occupied by normal recording, the blocks already used in the area NW, and the blocks already used in the area RW. The allocation manager 30 writes this into the memory 32 and, upon completion of the recording session, it records the information in the table of contents in the administrative area 43 on the disc.

When the disc 2 is loaded into the apparatus 1 a next time a similar procedure is carried out: the allocation manager 30 recognizes the addresses that have been used. From this information it can derive what free user area is left. A part of this area is reserved for replacement recording. This need not be the same part as during a previous recording.

Normally, the size of the replacement zone RW in the free user area 47 is larger than that of the spare area 42 and large enough to handle the number of replacement recordings which occurs under normal conditions.

If during recording the residual free user space becomes small because the disc is getting full, while there is still room in the replacement space, the allocation manager 30 can reduce the replacement space by informing the write control unit 20 of this. In this way, the whole disc can be used for storage. It is possible that during the recording session the write control unit 20 also supplies information to the allocation manager 30 about the size of the residual non-used part of the replacement zone RW, as a result of which, if the number of replacement recordings is comparatively large and the replacement zone is therefore about to become full even before the recording session has been completed, the allocation manager 30 can extend the replacement zone RW.

Once a part of the free user area 47 has been reserved by the allocation manager 30 the allocation manager 30 will no longer consider this part as being freely available for normal recording.

The method proposed by the present invention has some major advantages. During the recording session or recording process the size of the replacement area in the free space can be changed dynamically. This does not give rise to any loss of playing time as a result of the reserved replacement area. Moreover, the disc can still be used, even when more than 3% of the recording area is defective. Theoretically, the disc can even be used when nearly 100% of the storage space is defective but the residual playing time decreases according as more storage space is defective and more replacement space is required (graceful degradation). This is in contradistinction to the conventional method, where a disc is no longer usable when more than 3% of defects occurs.

Thus, in summary, the present invention in particular provides a method of recording real time video signals on a DVR disc having a recording area 40 which includes an administrative area 43, a spare area 42, and a user area 41. Normal recording is effected in blocks 45 in a first pre-reserved zone NW of a free part 47 of the user area. If a defective block 45* is encountered during the recording process a replacement recording of a file portion having the size of a plurality of blocks is made in a second pre-reserved zone RW of the free part 47 of the user area, after which normal recording is continued in the first pre-reserved zone NW. On the one hand, this reduces the number of jumps and limits the number of jumps occurring within a short period of time for the purpose of replacement recording and, on the other hand, a very efficient use is made of the storage capacity of the disc.

It will be evident to one skilled in the art that the scope of the present invention is not limited to the examples described hereinbefore but that that various changes and modifications thereto are possible without departing from the scope of the invention as defined in the appended Claims.

The invention claimed is:

1. A method of recording information, particularly real time video or audio, on a recording disc of the type having a multitude of concentric substantially circular recording tracks divided into blocks, particularly an optical disc, which recording tracks together define a recording area of the disc, which recording area includes at least a freely accessible addressable user area;
   wherein the information to be recorded is divided into data packets having the size of a block,
   wherein successive data packets are recorded in different blocks of said user area;
   wherein, if a block appears to be defective, a replacement recording for the relevant data packet is effected in a replacement zone within said user area; and
   wherein during the recording session, the replacement zone has a size that can change dynamically.

2. A method as claimed in claim 1, wherein, prior to the recording session, a given part of said freely accessible addressable user area is reserved as the replacement zone.

3. A method as claimed in claim 1, wherein, during the recording session, an extra part of said freely accessible addressable user area is reserved as the replacement zone, if necessary.

4. A method as claimed in claim 1, wherein, during the recording session, the reservation of a part of the replacement zone is cancelled, if necessary, in order to make said part available again as a free user area.

5. A method as claimed in claim 1, wherein, if a defective block is encountered during the recording process, the replacement recording is made for a file portion comprising a the plurality of successive data packets.

6. A recording apparatus adapted to carry out a method as claimed in any one of the claim 1.

7. A recording apparatus as claimed in claim 6, comprising:
   a write control unit adapted to control the write process, and an allocation manager adapted to determine at which location of a disc a write operation is to be effected;
   wherein the allocation manager is adapted to reserve two different areas for recording in a free part of the user area, a first pre-defined area being reserved for normal recording and a second pre-defined area being reserved for replacement recording;
   the allocation manager being adapted to inform the write control unit about these reserved areas;
   the write control unit being adapted to effect the normal recording in the first pre-defined area and, if defective blocks are encountered, time interval effect a replacement recording for a file portion having the size of a plurality of blocks in the second pre-defined area and, upon completion of the replacement recording, to proceed with normal recording in the first pre-defined area.

8. A recording apparatus as claimed in claim 7, wherein the write control unit is adapted to inform the allocation manager, upon completion of a recording process, of the addresses used in the second pre-defined area, and wherein the allocation manager is adapted to enter said addresses used in the second pre-defined area into a memory associated with the allocation manager and into a table of contents in an administrative area of the recording area of the disc.

9. A recording apparatus as claimed in claim 7, wherein the allocation manager is adapted to include the address of the defective block having led to the replacement recording in a list of unreliable blocks, and to inhibit the use of the blocks included in said list for allocation when said two areas are reserved upon a subsequent recording command.

10. A method as claimed in claim 1, wherein, the replacement recording comprises recording a plurality of successive data packets following the data packet affected is recorded in the other part of said user area such that a number of the successive data packets is at least 100.

11. A recording apparatus adapted for recording information, particularly real time video or audio, on a recording disc of the type having a multitude of concentric substantially circular recording tracks divided into blocks, particularly an optical disc, which recording tracks together define a recording area of the disc which recording area includes at least a freely accessible addressable user area;
   wherein the information to be recorded is divided into data packets having the size of a block,
   wherein successive data packets are recorded in different blocks of said user area;
   wherein, if a block appears to be defective, a replacement recording for the relevant data packet is effected in a replacement zone part of said user area;
   a write control unit adapted to control the write process;
   an allocation manager adapted to determine at which location of the disc a write operation is to be effected, wherein the allocation manager is adapted to reserve two different areas for recording in a free part of the user area, a first pre-defined area being reserved for normal recording and a second pre-defined area being reserved for replacement recording and the allocation manager being adapted to inform the write control unit about these reserved areas; and
   the write control unit being adapted to effect the normal recording in the first pre-defined area and, if defective blocks are encountered, time interval effect a replacement recording for a file portion having the size of a plurality of blocks in the second pre-defined area and, upon completion of the replacement recording, to proceed with normal recording in the first pre-defined area; wherein the write control unit is adapted to inform the allocation manager, upon completion of a recording process, of the addresses used in the second pre-defined area, and wherein the allocation manager is adapted to enter said addresses used in the second pre-defined area into a memory associated with the allocation manager and into a table of contents in an administrative area of the recording area of the disc.

12. A recording apparatus as claimed in claim 11, wherein a part of said freely accessible addressable user area is reserved as the replacement zone prior to recording.

13. A recording apparatus as claimed in claim 11, wherein, during the recording session, an extra part of said freely accessible addressable user area is reserved as the replacement zone, if necessary.

14. A recording apparatus as claimed in claim 11, wherein, during the recording session, the reservation of a part of the replacement zone is cancelled, if necessary, in order to make said part available again as a free user area.

15. A recording apparatus as claimed in claim 11, wherein, if a defective block is encountered during the recording process, the replacement recording is made for a file portion comprising a plurality of successive data packets.

16. A method of recording information on a recording disc of the type having recording tracks divided into blocks, which recording tracks together define a recording area, which recording area includes at least a freely accessible addressable user area, wherein the information to be recorded is divided into data packets having the size of a block and successive data packets are recorded in different blocks of said user area and wherein, a defective block is recorded via a replacement recording in a replacement zone of said user area; and wherein the replacement recording comprises recording a plurality of successive data packets following the data packet effected is recorded in the other part of said user area.

17. A method as claimed in claim 16, wherein, prior to the recording session, a given part of said freely accessible addressable user area is reserved as the replacement zone.

18. A method as claimed in claim 16, wherein, during the recording session, an extra part of said freely accessible addressable user area is reserved as the replacement zone, if necessary.

19. A method as claimed in claim 16, wherein, during the recording session, the reservation of a part of the replacement zone is cancelled, if necessary, in order to make said part available again as a free user area.

20. A method as claimed in claim 16, wherein, if a defective block is encountered during the recording process, the replacement recording is made comprising the plurality of successive data packets such that a number of the successive data packets is at least 100.

* * * * *